ional Inc.,

United States Patent
Smith

[19]

[11] Patent Number: 6,135,641
[45] Date of Patent: Oct. 24, 2000

[54] HYBRID DUPLEX BEARING ASSEMBLY HAVING THERMAL COMPENSATION

[75] Inventor: Dennis W. Smith, Phoenix, Ariz.

[73] Assignee: Honeywell International Inc., Morristown, N.J.

[21] Appl. No.: 08/961,295

[22] Filed: Oct. 30, 1997

[51] Int. Cl.$^7$ .................................................... F16C 32/00
[52] U.S. Cl. ........................................ 384/493; 384/905
[58] Field of Search ................................... 384/493, 557, 384/905, 499, 500, 501

[56] References Cited

U.S. PATENT DOCUMENTS

| | | | |
|---|---|---|---|
| 3,326,613 | 6/1967 | Renker | 384/493 |
| 3,561,829 | 2/1971 | Heldt | 384/557 |
| 3,851,933 | 12/1974 | Jacobson . | |
| 3,942,847 | 3/1976 | Parr . | |
| 4,076,191 | 2/1978 | Binge . | |
| 4,848,935 | 7/1989 | Seibig et al. | 384/276 |
| 5,249,869 | 10/1993 | Mabe | 384/278 |
| 5,562,349 | 10/1996 | Nespodzany, Jr. et al. | 384/493 |
| 5,593,234 | 1/1997 | Liston | 384/492 |

FOREIGN PATENT DOCUMENTS

| | | |
|---|---|---|
| 668448 | 8/1995 | European Pat. Off. . |
| 5-79514 | 3/1993 | Japan | 384/493 |

*Primary Examiner*—Thomas R. Hannon
*Attorney, Agent, or Firm*—Thomas A. Rendos; Robert E. Greenstien

[57] ABSTRACT

Disclosed is a bearing assembly with thermal compensation. The bearing assembly includes a bearing mechanism defined by a pair of races and a plurality of bearing elements. The races are manufactured from a material having a coefficient of thermal expansion that is substantially different than the coefficient of thermal expansion of the material from which the bearing elements are manufactured. A thermal compensation mechanism of the bearing assembly is contiguous with the races. The thermal compensation mechanism permits movement of the races relative to the bearing elements in a direction parallel the rotational axis of the bearing mechanism as a result of the effect of temperature variations on the materials of the races and bearing elements.

23 Claims, 3 Drawing Sheets

HYBRID DUPLEX BEARING ASSEMBLY HAVING THERMAL COMPENSATION

BACKGROUND OF THE INVENTION

This invention relates to bearing assemblies. In particular, the present invention is a thermal compensation mechanism, that permits expansion and contraction, due to temperature variations, of a preloaded pair of duplex ball bearing mechanisms having components with different coefficients of thermal expansion.

In the aviation industry and the space industry, it is critical that aircraft and spacecraft systems be manufactured to be as lightweight and durable as possible. In particular with regard to spacecraft, it is essential that lightweight materials be used to manufacture spacecraft components of spacecraft systems, since each incremental increase in spacecraft component weight requires an incremental increase in the amount of rocket fuel required to launch the spacecraft into outer space. Because spacecraft components of spacecraft systems are submitted to high structural stresses and extreme temperature fluctuations within the range of 180° F. to −65° F., it is also essential that spacecraft components be manufactured of materials that are durable. However, it is not always possible to manufacture spacecraft components of a spacecraft system to a desired weight and a desired durability using a single material. Hence, spacecraft systems often are comprised of spacecraft components manufactured of various materials, with the choice of a particular material being dependent upon the purpose served by the particular spacecraft component. Typically, spacecraft components subjected to high structural stresses are manufactured from heavy, structurally strong and durable materials, while spacecraft components that are not subject to extreme structural stresses are manufactured from lightweight, less durable materials.

One concern of tailoring the material to the purpose of the spacecraft component is that different materials exhibit different physical properties. One of these physical properties that can vary from one material to the next is the coefficient of thermal expansion (CTE). For example, bearing mechanisms (such as preloaded, angular contact, duplex bearing assemblies) within spacecraft components typically use dissimilar materials for different bearing mechanism components. For instance, ceramic balls are used with steel rings (i.e., races) to form a hybrid bearing. The ceramic balls are lightweight, wear resistant and exhibit low rolling friction, while the steel rings are heavy and provide the necessary strength and durability for mounting to other spacecraft components.

The ceramic material of the bearing balls typically has a CTE of 1.6E-06 in./in. −° F., while the steel material of the bearing rings has a much higher CTE of 5.6E-06 in./in. −° F., resulting in a bearing mechanism that is very sensitive to operating temperature. For example, as the operating temperature of the hybrid bearing mechanism of this type decreases, the steel rings contract more rapidly than the ceramic balls, resulting in a decrease in the diametrical clearance between the balls and the rings. This results in an effective decrease in the bearing contact angle and an increase in the bearing preload, which causes unwanted increases in the drag torque and operating stress of the bearing mechanism. These drag torque and operating stress increases result in a bearing life reduction that is critical in a spacecraft environment.

Currently, this unlike expansion and contraction of bearing components, due to the affect of temperature variations on materials having different CTE's, is dealt with by designing the bearing mechanism so that it will have the desired contact angle and preload at the anticipated operating temperature and either limiting the temperature variations seen by the bearing mechanism or accepting the preload and contact angle changes and the consequent drag torque increase and life reduction that occurs due to the operating temperature range.

A similar problem, as described above in relation to a hybrid bearing, also exists due to the difference in CTE's between bearing mechanism materials and bearing mounting structure materials. Typically, in a spacecraft component, the steel rings of the bearing mechanism are secured to mounting structures which are made of aluminum (a lightweight material). The steel of the bearing mechanism rings has a CTE of 5.6E-06 in./in. −° F., while the aluminum of the mounting structures has a much higher CTE of 12.4E-06 in./in. −° F. In the environment of space, the mounting structures and bearing mechanism are subjected to temperature variations within the range of 180 degrees F. to −65 degrees F. These temperature variations, together with the differing CTE's of steel and aluminum, cause the mounting structures and bearing mechanism to expand and contract at different rates. in turn, this differential expansion or contraction causes gaps or contact pressure points, respectively, between the bearing mechanism and the mounting structures, which results in large bearing stresses and high drag torque and ultimately shorter bearing life.

There is a need for thermal compensation mechanisms for bearing assemblies. In particular, there is a need for a thermal compensation mechanism that will virtually eliminate bearing stresses due to the affects of extreme temperature fluctuations on the materials (having differing CTE's) of the bearing assembly components. In addition, the thermal compensation mechanism should be relatively maintenance free and provide a weight efficient structure.

SUMMARY OF THE INVENTION

The present invention is a bearing assembly with thermal compensation. The bearing assembly includes a bearing mechanism and a thermal compensation mechanism. The bearing mechanism has first and second races formed of a first material having a first coefficient of thermal expansion (CTE). A plurality of bearing elements of the bearing mechanism permit relative rotation of the first and second races about a rotational axis. Each of the bearing elements is formed of a second material having a second (CTE) that is different from the first CTE. The thermal compensation mechanism is contiguous with the first and second races. The thermal compensation mechanism permits movement of the first and second races relative to the plurality of bearing elements in a direction parallel to the rotational axis as a result of the effect of temperature variations on the first and second materials.

This bearing assembly with thermal compensation virtually eliminates bearing stresses due to the affects of extreme temperature fluctuations on the materials (having differing coefficients of thermal expansion) of the bearing assembly components. In particular, the thermal compensation mechanism permits differential expansion and contraction of the bearing races and bearing elements, while maintaining a more consistent preload over a wide operating temperature range then normally associated with bearing assembly components using materials having different CTE's. By maintaining a consistent preload when subjected to temperature variations, the thermal compensation mechanism optimizes bearing drag torque and bearing life performance. In addition, this bearing assembly with thermal compensation permits differential expansion and contraction of bearing assembly components, as a result of temperature variations, while maintaining a weight efficient structure.

DETAILED DESCRIPTION OF THE PREFERRED EMBODIMENT

Figure 1:
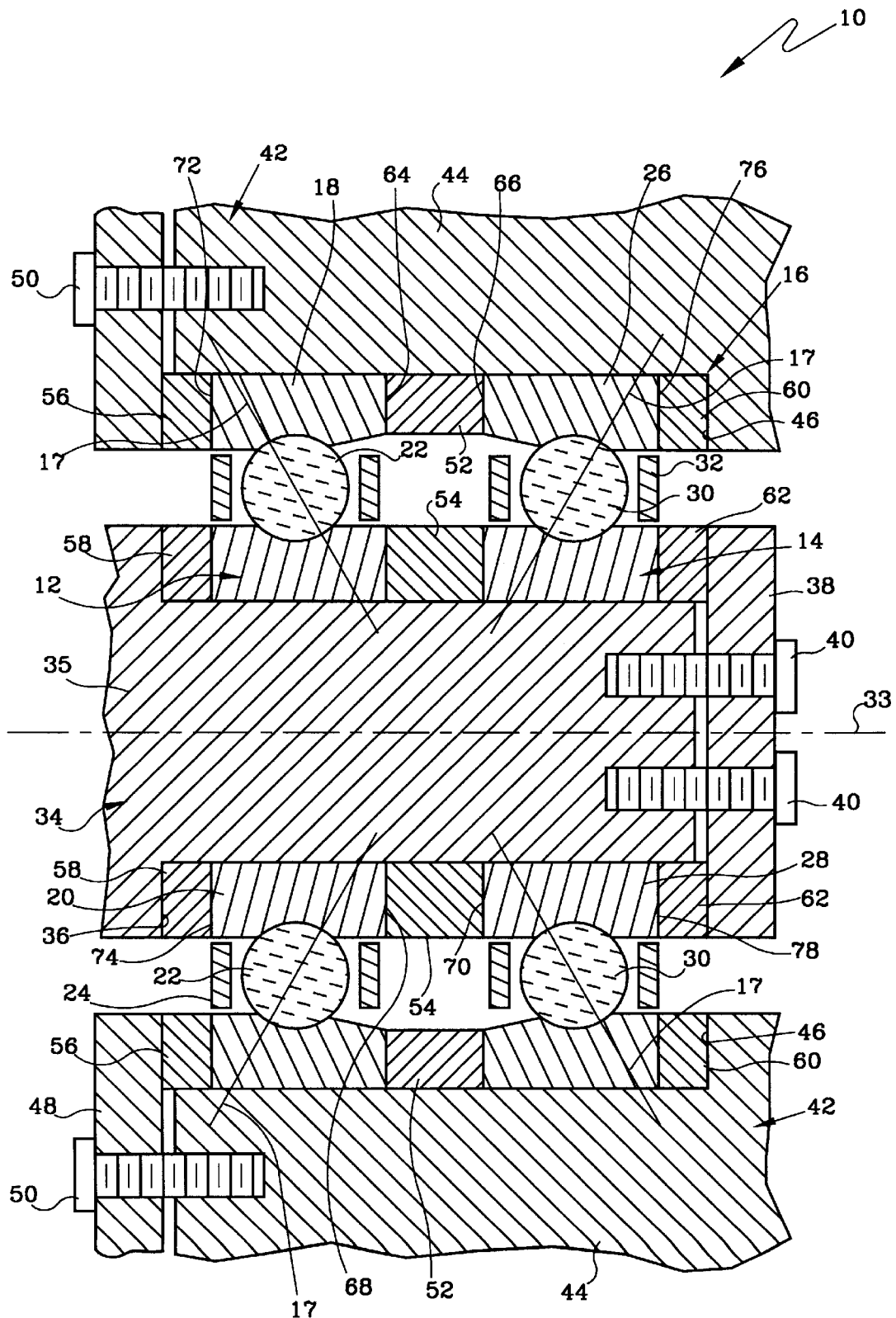
FIG. 1 is a sectional view of a bearing assembly having a thermal compensation mechanism in accordance with the present invention, with components being depicted at a desired emplacement temperature.

A bearing assembly 10 in accordance with the present invention is illustrated generally in FIG. 1. The bearing assembly 10 includes first and second bearing mechanisms 12 and 14, respectively, and a thermal compensation mechanism 16. The first bearing mechanism 12 is defined by outer and inner bearing rings or races 18 and 20, respectively, a plurality of ball bearing elements 22 and a ball bearing cage 24. The second bearing mechanism 14 (like the first bearing mechanism 12) is defined by outer and inner bearing races 26 and 28, respectively, a plurality of ball bearing elements 30 and a ball bearing cage 32. The ball bearing elements 22 and 30 permit relative rotation of the inner races 20 and 28 and the outer races 18 and 26 about a rotational axis 33. in one preferred embodiment, the first and second bearing mechanisms 12 and 14 are a preloaded pair of duplex, coacting angular contact, hybrid ball bearing mechanisms having their load paths along lines 17. Preferably, the outer and inner races 18, 20, 26 and 28 are all manufactured of steel, such as 440 C. steel having a coefficient of thermal expansion (CTE) of 5.6E-06 in./in. $-^\circ$ F., while the ball bearing elements 22 and 30 are manufactured of a ceramic material, such as Silicon Nitride, having a much lower CTE of 1.6E-06 in./in. $-^\circ$ F. Therefore, the first and second bearing mechanisms 12 and 14 are very sensitive to operating temperature.

As seen best in FIG. 1, the inner bearing races 20 and 28 of the first and second bearing mechanisms 12 and 14 are mounted on a first mounting structure 34, such as a drive shaft, preferably by a light interference fit or by a line-to-line contact fit so as to prevent any relative radial movement of the inner races 20 and 28 with respect to the first mounting structure 34. The first mounting structure 34 includes a main element 35 having a shoulder 36, and a clamping element 38 which is secured to the main element 35 via screw fasteners 40. The shoulder 36 together with a clamping element 38 tightly clamps the inner races 20 and 28 to the first mounting structure 34 and restrain axial movement of the inner races 20 and 28 parallel to the rotational axis 33.

The outer races 18 and 26 of the first and second bearing mechanisms 12 and 14 are mounted on a second mounting structure 42, such as a housing. Unlike the inner races 20 and 28, the outer races 18 and 26 are preferably mounted via a slight clearance fit. The second mounting structure 42 includes a main member 44 having a shoulder 46, and a clamping member 48 which is secured to the main member 44 via screw fasteners 50. The shoulder 46 together with a clamping member 48 tightly clamps the outer races 18 and 26 to the second mounting structure 42 thereby preloading the first and second bearing mechanisms 12 and 14. In addition, the coaction of the shoulder 46 and the clamping member 48 restrains axial movement of the outer races 18 and 26 parallel to the rotational axis 33. Relative radial movement of the outer races 18 and 26 with respect to the second mounting structure 42 is prevented by the axial clamping force between the outer clamping member 48 and the shoulder 46.

In one preferred embodiment, the main and clamping elements and members 35, 44, 38 and 48 of the first and second mounting structures 34 and 42 are manufactured of aluminum having a CTE of 12.4E-06 in./in. $-^\circ$ F. The CTE of aluminum of the first and second mounting structures 34 and 42 is much higher than the CTE of the steel of the outer and inner races 18, 20, 26 and 28 of the first and second bearing mechanisms 12 and 14, which presents an added factor to the sensitivity of the first and second bearing mechanisms 12 and 14 to operating temperature.

As seen best in FIG. 1, the thermal compensation mechanism 16 of the bearing assembly 10 includes first, second, third, fourth, fifth and sixth ring shaped spacer elements 52, 54, 56, 58, 60 and 62, respectively. The first and second spacer elements 52 and 54 are positioned between the first and second bearing mechanisms 12 and 14, respectively. The first spacer element 52 abuts an inner sidewall 64 of the outer race 18 as well as an inner sidewall 66 of the outer race 26. The second spacer element 54 abuts an inner sidewall 68 of the inner race 20 as well as an inner sidewall 70 of the inner race 28.

The third and fourth spacer elements 56 and 58 are positioned between the first bearing mechanism 12 and the first and second mounting structures 34 and 42. The third spacer element 56 abuts an outer sidewall 72 of the outer race 18 as well as the clamping member 48 of the second mounting structure 42. The fourth spacer element 58 abuts an outer sidewall 74 of the inner race 20 as well as the shoulder 36 of the main element 35 of the first mounting structure 34.

Lastly, the fifth and sixth spacer elements 60 and 62 are positioned between the second bearing mechanism 14 and the first and second mounting structures 34 and 42. The fifth spacer element 60 abuts an outer sidewall 76 of the outer race 26 as well as the shoulder 46 of the main member 44 of the second mounting structure 42. The sixth spacer element 62 abuts an outer sidewall 78 of the inner race 28 as well as the clamping element 38 of the first mounting structure 34. As can be seen in FIG. 1, the third, fourth, fifth and sixth spacer elements 56, 58, 60 and 62 are half the length of the first and second spacer elements 52 and 54 as measured along an axis parallel to the rotational axis 33. In one preferred embodiment, when the components of the first and second bearing mechanisms 12 and 14 are manufactured of steel and ceramic as previously described, the first, fourth and sixth spacer elements 52, 58 and 62 are manufactured of invar having a CT-E of 0.5E-06 in./in. $-^\circ$ F., while the second, third and fifth spacer elements 54, 56 and 60 are manufactured of brass having a CTE of 13.5E-06 in./in. $-^\circ$ F.

In practice, the bearing assembly 10 defined by the first and second ball bearing mechanisms 12 and 14, the first and second mounting structures 34 and 42 and the thermal compensation mechanism 16 are all fitted together at an emplacement temperature, such as room temperature (i.e., 55° F. to 80° F.). In the environment of space, the bearing assembly 10 is subjected to operating temperature variations within the range of 180° F. to −65° F. These temperature fluctuations, together with the differing CTE's of steel (i.e., the material from which the outer and inner races 18, 20, 26 and 28 are formed) and ceramic (i.e., the material from which the ball bearing elements 22 and 30 are formed) cause these components of the first and second bearing mechanisms to expand and contract at different rates. Because the first, fourth and sixth spacer elements 52, 58 and 62 are made of a different material having a different CTE than the material from which the second, third and fifth spacer elements 54, 56 and 60 are made, the spacer elements 52–62 of the thermal compensation mechanism 16 permit linear movement (i.e., expansion and contraction) of the outer and inner races 18, 20, 26 and 28 relative to the bearing elements 22 and 30 in a direction parallel to the rotational axis 33 as a result of the effect of temperature fluctuations on the materials from which the components of the first and second bearing mechanisms are manufactured. In other words, at operating temperatures different than the emplacement temperature, the change in the axial length of the spacer elements 52–62 (due to temperature changes) and the difference in the axial lengths of the first, fourth and sixth spacer elements 52, 58 and 62 relative to the difference in axial lengths of the second, third and fifth spacer elements 54, 56 and 60 (due to temperature changes) substantially equals the "stickout" of the outer and inner races 18, 20, 26 and 28 (i.e., the linear axial movement of the inner races 20 and 28 relative to the outer races 18 and 26 due to temperature changes).

Figure 2:
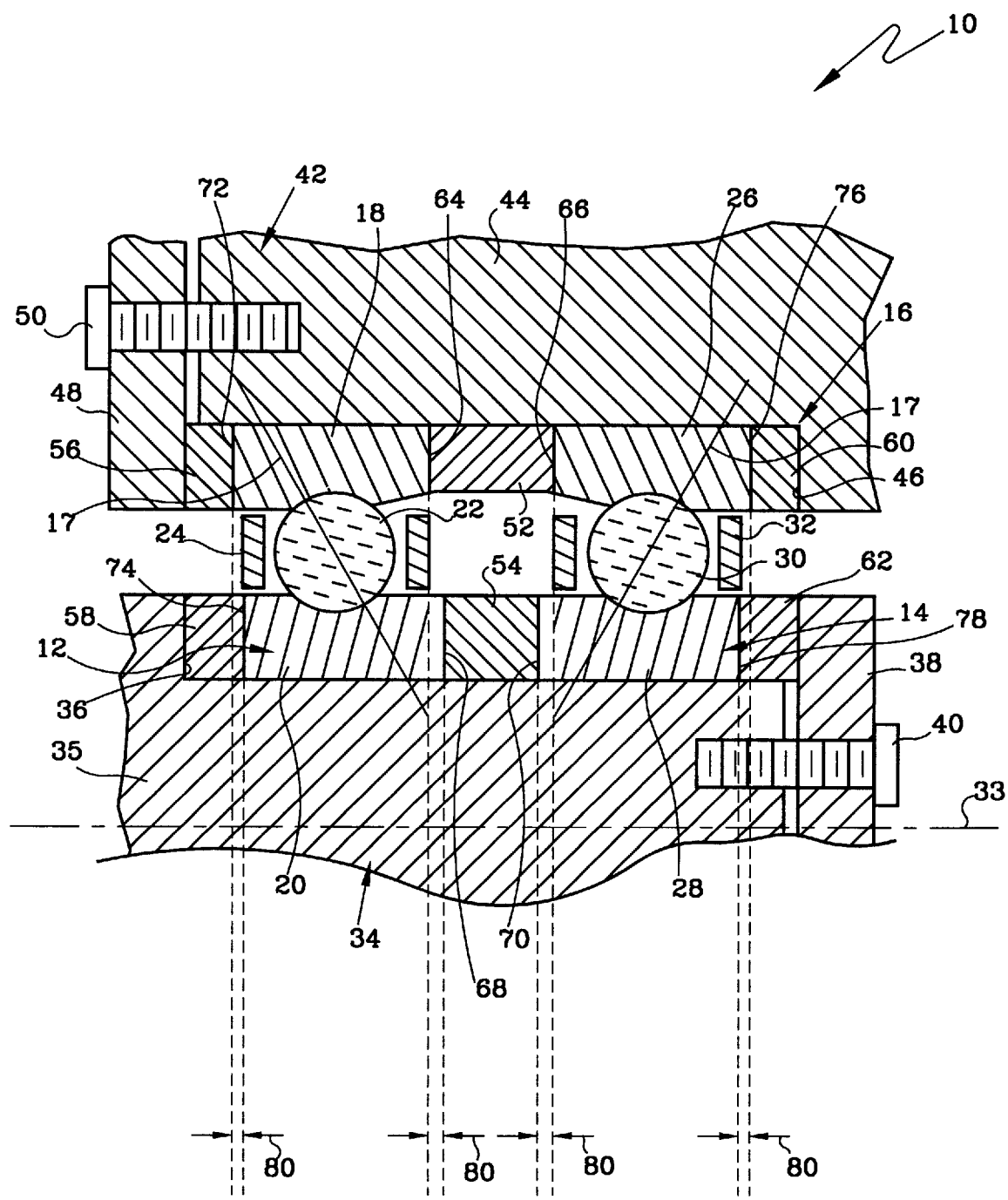
FIG. 2 is a partial sectional view of FIG. 1, but with the relative disposition of the bearing assembly and thermal compensation mechanism components being shown at a temperature less than the desired emplacement temperature.
Figure 3:
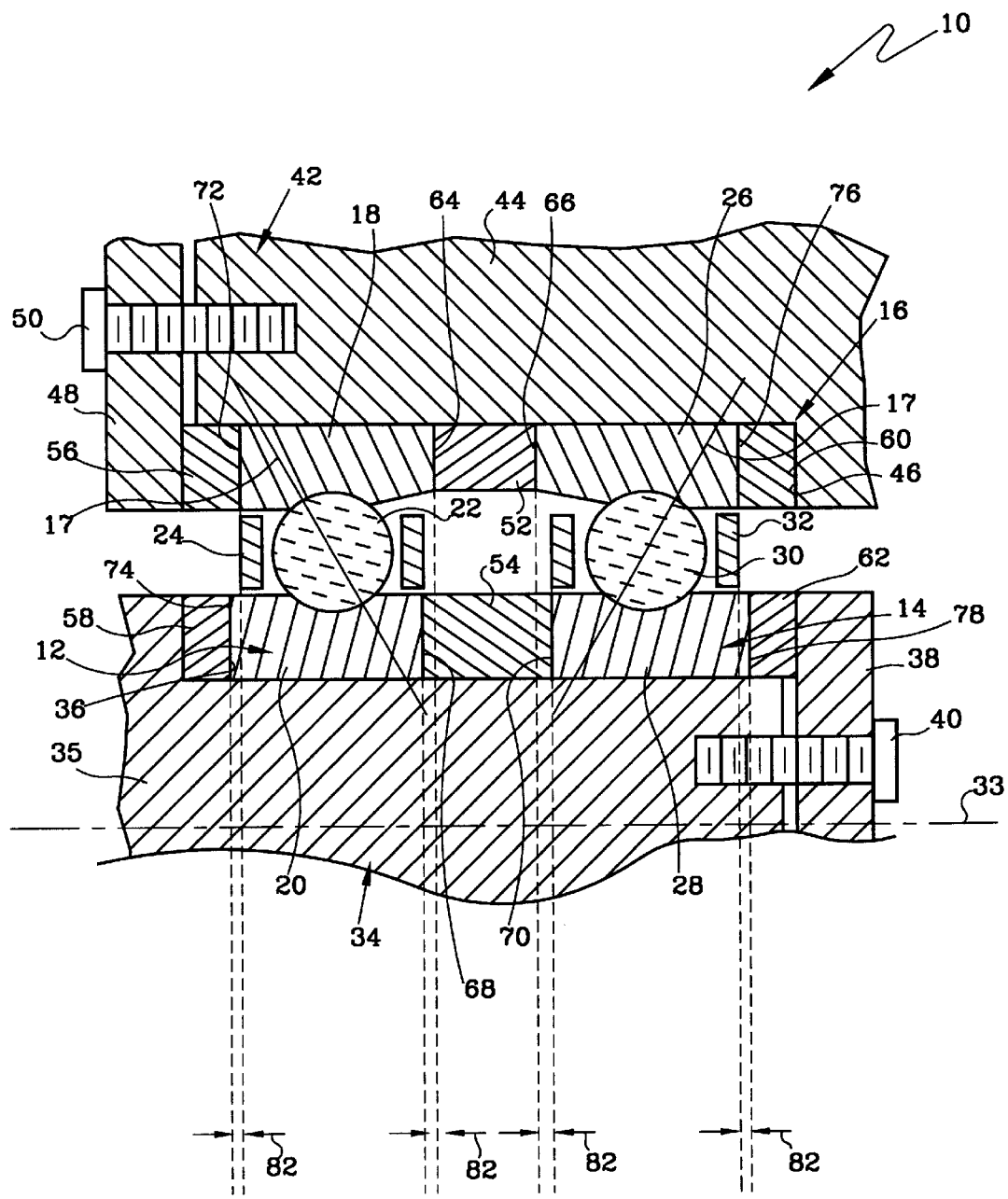
FIG. 3 is a partial sectional view of FIG. 1, but with the relative disposition of the bearing assembly and thermal compensation mechanism components being shown at a temperature greater than the desired emplacement temperature.

FIGS. 2 and 3 illustrate the relative disposition of the spacer elements 52–62 and the outer and inner races 18, 20, 26 and 28 at a temperature less than (FIG. 2) and greater than (FEG. 3) the desired emplacement temperature. The stickout of the races 18, 20, 26 and 28, the changes in axial length of the spacer elements 52–62 and the differences in the changes in axial length between the first, fourth and sixth spacer elements 52, 58 and 62 and the second, third and fifth spacer elements 54, 56 and 60 are illustrated by the exaggerated distances labeled with reference numerals 80 (FIG. 2) and 82 (FIG. 3). In actuality, the distances represented by numerals 80 and 82 would be on the order of 0.0005 inches. In a manner likewise to what has been described above with regard to the thermal compensation mechanism 16 compensating for the differences in CTE's of the components of the first and second bearing mechanisms 12 and 14, the thermal compensation mechanism 16 also compensates for the differences in CTE's between the aluminum of the first and second mounting structures 34 and 42 and the steel of the outer and inner races 18, 20, 26 and 28. In this case, the thermal compensation mechanism 16 would permit linear movement (i.e., expansion and contraction) of the outer and inner races 18, 20, 26 and 28 relative to the first and second mounting structures 34 and 42 in a direction parallel to the rotational axis 33 as a result of the effect of temperature variations on the materials of the bearing mechanisms 12 and 14 and the mounting structures 34 and 42.

The bearing assembly 10 with thermal compensation virtually eliminates bearing stresses due to the affects of extreme temperature fluctuations on the materials (having differing coefficients of thermal expansion) of the bearing assembly components. In particular, the thermal compensation mechanism 16 permits differential expansion and contraction of the bearing races 18, 20, 26 and 28 and bearing elements 22 and 30, while maintaining a more consistent preload over a wide operating temperature range then normally associated with bearing assembly components using materials having different CTE's. By maintaining a consistent preload when subjected to temperature variations, the thermal compensation mechanism 16 optimizes bearing drag torque and bearing life performance. In addition, this bearing assembly 10 with thermal compensation permits differential expansion and contraction of bearing assembly components, as a result of temperature variations, while maintaining a weight efficient structure.

Although the present invention has been described with reference to preferred embodiments, workers skilled in the art will recognize that changes may be made in form and detail without departing from the spirit and scope of the invention. For example, though the first and second bearing mechanisms 12 and 14 have been described as having ball bearing elements, the thermal compensation mechanism 16 of the present invention would also work with bearing mechanisms incorporating tapered roller bearing elements.

I claim:

1. A bearing assembly having thermal compensation, comprising: a bearing mechanism, including:

first and second races each formed of a first material having a first coefficient of thermal expansion; and a plurality of bearing elements permitting relative rotation of the first and second races about a rotational axis, wherein each of the plurality of bearing elements is formed of a second material having a second coefficient of thermal expansion that is different than the first coefficient of thermal expansion; and a thermal compensation mechanism contiguous with the first and second races, the thermal compensation mechanism permitting movement of the first and second races relative to the plurality of bearing elements in a direction parallel to the rotational axis as a result of the effect of temperature variations on the first and second materials.

2. The bearing assembly of claim 1 wherein the thermal compensation mechanism includes:

a first ring shaped spacer element abutting one side of the first race; and a second ring shaped spacer element abutting one side of the second race.

3. The bearing assembly of claim 2 wherein the first spacer element is formed of a third material having a third coefficient of thermal expansion, and the second spacer element is formed of a fourth material having a fourth coefficient of thermal expansion that is different than the third coefficient of thermal expansion.

4. The bearing assembly of claim 3 wherein the third and fourth coefficients of thermal expansion are different than the first and second coefficients of thermal expansion.

5. The bearing assembly of claim 2 wherein the thermal compensation mechanism further includes:

a third ring shaped spacer element abutting an opposite side of the first race; and a fourth ring shaped spacer element abutting an opposite side of the second race.

6. The bearing assembly of claim 5 wherein the first and fourth spacer elements are each formed of a third material having a third coefficient of thermal expansion, and the second and third spacer elements are each formed of a fourth material having a fourth coefficient of thermal expansion that is different than the third coefficient of thermal expansion.

7. The bearing assembly of claim 6 wherein the third and fourth coefficients of thermal expansion are different than the first and second coefficients of thermal expansion.

8. The bearing assembly of claim 1, and further comprising:
an additional bearing mechanism adjacent to the bearing mechanism, the additional bearing mechanism including:
first and second races; and
a plurality of bearing elements permitting relative rotation of the first and second races of the additional bearing mechanism about the rotational axis.

9. The bearing assembly of claim 8 wherein the first and second races of the additional bearing mechanism are each formed of the first material having the first coefficient of thermal expansion, and the plurality of bearing elements of the additional bearing mechanism are each formed of the second material having the second coefficient of thermal expansion.

10. The bearing assembly of claim 9 wherein the thermal compensation mechanism is contiguous with the first and second races of each of the bearing mechanism and the additional bearing mechanism.

11. The bearing assembly of claim 10 wherein the thermal compensation mechanism includes:
a first ring shaped spacer element positioned between and abutting first sides of the first races of the bearing and additional bearing mechanisms; and
a second ring shaped spacer element positioned between and abutting first sides of the second races of the bearing and additional bearing mechanisms.

12. The bearing assembly of claim 11 wherein the first spacer element is formed of a third material having a third coefficient of thermal expansion, and the second spacer element is formed of a fourth material having a fourth coefficient of thermal expansion that is different than the third coefficient of thermal expansion.

13. The bearing assembly of claim 12 wherein the third and fourth coefficients of thermal expansion are different than the first and second coefficients of thermal expansion.

14. The bearing assembly of claim 11 wherein the thermal compensation mechanism further includes:
a third ring shaped spacer element abutting an opposite side of the first race of the bearing mechanism; and
a fourth ring shaped spacer element abutting an opposite side of the second race of the bearing mechanism.

15. The bearing assembly of claim 14 wherein the first and fourth spacer elements are each formed of a third material having a third coefficient of thermal expansion, and the second and third spacer elements are each formed of a fourth material having a fourth coefficient of thermal expansion that is different than the third coefficient of thermal expansion.

16. The bearing assembly of claim 14 wherein the thermal compensation mechanism further includes:
a fifth ring shaped spacer element abutting an opposite side of the first race of the additional bearing mechanism; and
a sixth ring shaped spacer element abutting an opposite side of the second race of the additional bearing mechanism.

17. The bearing assembly of claim 16 wherein the first, fourth and sixth spacer elements are each formed of a third material having a third coefficient of thermal expansion, and the second, third and fifth spacer elements are each formed of a fourth material having a fourth coefficient of thermal expansion that is different than the third coefficient of thermal expansion.

18. The bearing assembly of claim 17 wherein the third, fourth, fifth and sixth spacer elements are half the length of the first and second spacer elements as measured along an axis parallel to the rotational axis.

19. The bearing assembly of claim 17 wherein the first material is steel, the second material is ceramic, the third material is invar and the fourth material is brass.

20. The bearing assembly of claim 17 wherein the bearing mechanism and additional bearing mechanism are a preloaded pair of duplex, coacting angular contact ball bearing mechanisms.

21. The bearing assembly of claim 1, and fiLrther including:
a first mounting structure for the first race of the bearing mechanism; and
a second mounting structure for the second race of the bearing mechanism.

22. The bearing assembly of claim 21 wherein the first and second mounting structures are each formed of a further material having a further coefficient of thermal expansion that is different than the first and second coefficients of thermal expansion, and wherein the thermal compensation mechanism is contiguous with the first and second mounting structures such that the thermal compensation mechanism permits movement of the first and second races relative to the first and second mounting structures in a direction parallel to the rotational axis as a result of the effect of temperature variations on the first, second and additional materials.

23. A bearing assembly having thermal compensation, comprising:
a bearing mechanism, including:
first and second races each formed of a first material having a first coefficient of thermal expansion; and
a plurality of bearing elements permitting relative rotation of the first and second races about a rotational axis, wherein each of the plurality of bearing elements is formed of the first material having the first coefficient of thermal expansion;
first and second mounting structures for the first and second races, respectively, each of the first and second mounting structures being formed of a second material having a second coefficient of thermal expansion that is different than the first coefficient of thermal expansion; and
a thermal compensation mechanism contiguous with the first and second races and the first and second mounting structures, the thermal compensation mechanism permitting movement of the first and second races relative to the first and second mounting structures in a direction parallel to the rotational axis as a result of the effect of temperature variations on the first and second materials.

* * * * *